(No Model.)
L. S. PFOUTS.
TROLLEY AND FEED WIRE BRACKET.
No. 526,409. Patented Sept. 25, 1894.
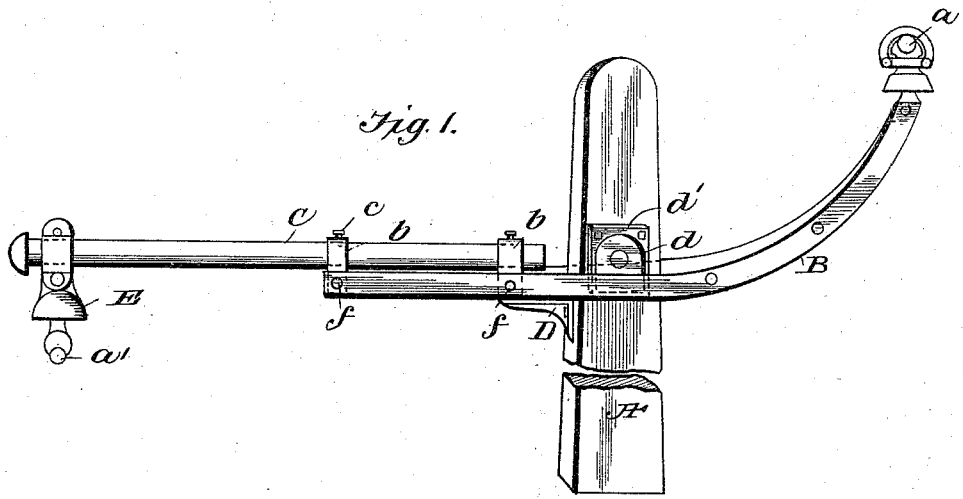
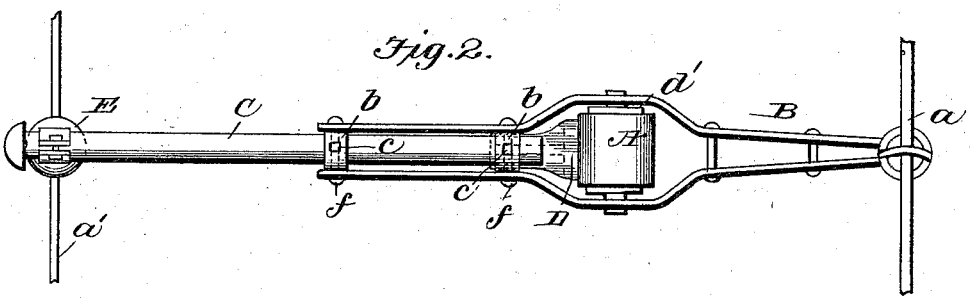
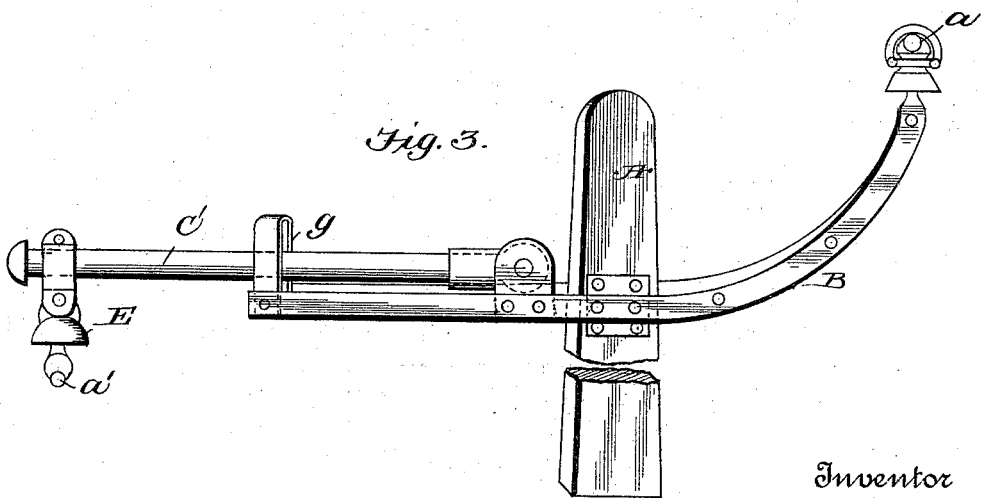
Inventor
Leroy S. Pfouts
by F. W. Bond
Attorney
Witnesses

UNITED STATES PATENT OFFICE.

LEROY S. PFOUTS, OF CANTON, OHIO.

TROLLEY AND FEED WIRE BRACKET.

SPECIFICATION forming part of Letters Patent No. 526,409, dated September 25, 1894.

Application filed January 11, 1894. Serial No. 496,562. (No model.)

*To all whom it may concern:*

Be it known that I, LEROY S. PFOUTS, a citizen of the United States, residing at Canton, in the county of Stark and State of Ohio, have invented certain new and useful Improvements in Trolley and Feed Wire Brackets; and I do hereby declare that the following is a full, clear, and exact description of the same, reference being had to the annexed drawings, making a part of this specification, and to the letters of reference marked thereon, in which—

Figure 1, is a side elevation of the bracket proper, showing the same attached to a pole. Fig. 2, is a top view of the bracket, showing the parts properly located. Fig. 3, is a side elevation, showing a slight modification.

The present invention has relation to trolley and feed wire brackets, and it consists in the different parts and combination of parts hereinafter described, and particularly pointed out in the claims.

Similar letters of reference indicate corresponding parts in all the figures of the drawings.

In the accompanying drawings A, represents the pole, which may be of any desired kind or style, reference being had to properly attaching the different parts hereinafter described.

To the top or upper portion of the pole A, are pivotally attached the feed wire supporting arms B, which are bent or curved upward, as illustrated in the drawings.

To the upper ends of the arms B, is attached the feed wire a, in the ordinary manner. The arms B extend and pass beyond the opposite side of the pole from which the feed wire is attached, substantially as illustrated in Figs. 1 and 2.

To the arms B, is attached the trolley wire supporting arm C, by means of the clamps b, which clamps are provided with the set-screws c, said set-screws being for the purpose of securely holding the trolley wire supporting arms C at the desired points of longitudinal adjustment.

To the pole A, and below the arms B is securely attached the bracket D, which bracket is for the purpose of supporting the arms B and C in the position illustrated in Fig. 1.

If desired the arms B, may be provided with the flanges d, which flanges are provided with suitable apertures to receive a pivoting bolt or its equivalent.

For the purpose of providing a surface to properly attach the arms B, the metal plates d' may be used; but it will be understood, that the metal plates d' are not absolutely necessary inasmuch as the inner faces of the arms B may come in direct contact with the pole A and the same object accomplished.

To the outer end of the trolley wire supporting arm C, is securely attached the trolley wire supporting clamp E, which clamp may be of any desired style or kind.

It will be understood that by pivotally attaching the arms B, to the pole A, and securing the trolley wire supporting arm C to said arms B, that as the trolley passes under the trolley wire supporting clamp E, the free end of the arm C, will be permitted to ascend carrying with it the trolley wire, thereby preventing any injury to the trolley wire clamp or the supporting arm C.

The clamps b are securely attached to the arms B by means of the clamping bolts f or their equivalents.

It will be understood that by providing the clamps b, and the set-screws c, that the trolley wire supporting arm C can be adjusted longitudinally, thereby providing a means for adjusting the trolley wire so as to bring the trolley wire directly over the center of the railway track.

By attaching the feed wire a, to the ends of the arms B, said feed wire will act as a counter-balance to a certain extent, thereby causing the free end of the arm C to be easily lifted as the trolley passes under the arm C and its clamp E.

It will be understood that at intervals along the railway track lateral feed wires are to extend from the feed wire a to the trolley wire a'. In Fig. 3, I have illustrated a modified form, which consists in rigidly attaching the arms B' to the pole A, and pivotally connecting the trolley wire supporting arm C' to the arms B'; and for the purpose of limiting the movement of the arm C', the yoke g is provided, which yoke is attached to the arms B'.

By attaching the feed wire a to the arms B, said arms B and the trolley wire supporting arm C, will be held in proper lateral adjustment at all times, and the lateral strain will be removed from the arms B and C, in the event the trolley wire $a'$ is broken inasmuch as the feed wire $a$, will counteract any sudden strain that may be brought upon the arm C.

The trolley wire supporting arms C and C' are preferably formed separate from the feed wire arms B, but it will be understood that the feed wire arms may be extended laterally a sufficient distance to attach the trolley wire without departing from the nature of my invention. By placing the feed and trolley wire supporting arms at right angles, to the pole and wires, I am enabled to hold the trolley wire a sufficient distance from the pole, to allow cars to pass the poles, and at the same time providing a yielding support for the trolley wire.

Having fully described my invention, what I claim as new, and desire to secure by Letters Patent, is—

1. The combination of a pole provided with a pivoted feed wire arm, having attached thereto a trolley wire supporting arm, both of the arms located at right angles to the trolley and feed wires, substantially as and for the purpose specified.

2. The combination of a pole provided with a pivoted arm, carrying a feed wire, and a trolley wire supporting arm, said arm located at right angles to the feed and trolley wires, substantially as and for the purpose specified.

3. The combination of a pole provided with a feed wire carrying arm, and a trolley wire supporting arm, located at right angles to the pole, and to the trolley wire and feed wire, and a bracket, substantially as and for the purpose specified.

4. The combination of a pole for street railways, provided with a pivoted trolley wire supporting arm, located at right angles to the trolley wire, substantially as and for the purpose specified.

In testimony that I claim the above I have hereunto subscribed my name in the presence of two witnesses.

LEROY S. PFOUTS.

Witnesses:
F. W. BOND,
E. A. C. SMITH.